(12) United States Patent
Chng et al.

(10) Patent No.: US 11,882,416 B2
(45) Date of Patent: *Jan. 23, 2024

(54) EXTERNAL MICROPHONE ARRAYS FOR SOUND SOURCE LOCALIZATION

(71) Applicant: WAYMO LLC, Mountain View, CA (US)

(72) Inventors: Choon Ping Chng, Los Altos, CA (US); Cheng-Han Wu, Sunnyvale, CA (US); Ganesh Balachandran, Palo Alto, CA (US); Peter Strohm, Stanford, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,187

(22) Filed: Sep. 2, 2022

(65) Prior Publication Data

US 2022/0417657 A1 Dec. 29, 2022

Related U.S. Application Data

(63) Continuation of application No. 16/999,830, filed on Aug. 21, 2020, now Pat. No. 11,483,649.

(51) Int. Cl.
*H04R 3/00* (2006.01)
*H04R 1/40* (2006.01)
*H04R 1/08* (2006.01)

(52) U.S. Cl.
CPC ............. *H04R 3/005* (2013.01); *H04R 1/083* (2013.01); *H04R 1/406* (2013.01)

(58) Field of Classification Search
CPC ......... H04R 3/005; H04R 1/083; H04R 1/406

USPC ................. 381/56, 58, 86, 91, 122, 302
See application file for complete search history.

(56) References Cited

U.S. PATENT DOCUMENTS

| | | | |
|---|---|---|---|
| 6,151,539 A | 11/2000 | Bergholz et al. | |
| 6,173,059 B1 | 1/2001 | Huang et al. | |
| 8,676,427 B1 | 3/2014 | Ferguson et al. | |
| 8,798,905 B2 | 8/2014 | Yoshioka et al. | |
| 8,849,557 B1 | 9/2014 | Levandowski et al. | |
| 9,147,347 B2 | 9/2015 | Yoshioka et al. | |

(Continued)

FOREIGN PATENT DOCUMENTS

| | | |
|---|---|---|
| KR | 10-2016-0050285 A | 5/2016 |
| WO | 2017023313 A1 | 2/2017 |
| WO | 2020001892 A1 | 1/2020 |

OTHER PUBLICATIONS

Noam R. Shabtai et al., "Detecting the Direction of Emergency Vehicle Sirens With Microphones," EAA spatial Audio Signal Processing Symposium, Paris, France, pp. 137-142, Sep. 2019.

(Continued)

*Primary Examiner* — William A Jerez Lora
(74) *Attorney, Agent, or Firm* — McDonnell Boehnen Hulbert & Berghoff LLP

(57) ABSTRACT

A system includes multiple microphone arrays positioned at different locations on a roof of an autonomous vehicle. Each microphone array includes two or more microphones. Internal clocks of each microphone array are synchronized by a processor and used to generate timestamps indicating when microphones capture a sound. Based on the timestamps, the processor is configured to localize a source of the sound.

20 Claims, 7 Drawing Sheets

(56) References Cited

U.S. PATENT DOCUMENTS

| | | | |
|---|---|---|---|
| 9,176,500 B1 | 11/2015 | Teller et al. | |
| 9,213,338 B1 | 12/2015 | Ferguson | |
| 9,275,136 B1 | 3/2016 | Sharifi et al. | |
| 9,632,191 B2 | 4/2017 | Sato et al. | |
| 9,802,638 B1 | 10/2017 | Stoffel et al. | |
| 9,873,428 B2 | 1/2018 | Banvait et al. | |
| 9,937,922 B2 | 4/2018 | Reiff et al. | |
| 10,236,018 B2 | 3/2019 | Moore et al. | |
| 10,349,172 B1 | 7/2019 | Huang et al. | |
| 10,403,141 B2* | 9/2019 | Patil | G08G 1/166 |
| 11,483,649 B2 | 10/2022 | Chng et al. | |
| 2010/0217435 A1 | 8/2010 | Rodemann | |
| 2013/0142342 A1 | 6/2013 | Del Galdo et al. | |
| 2016/0183025 A1 | 6/2016 | Layton et al. | |
| 2016/0252905 A1 | 9/2016 | Tian et al. | |
| 2017/0213459 A1* | 7/2017 | Ogaz | G08G 1/166 |
| 2017/0330551 A1 | 11/2017 | Zafeiropoulos | |
| 2018/0350391 A1* | 12/2018 | Moore | B60Q 9/00 |
| 2019/0228305 A1 | 7/2019 | Lovison et al. | |
| 2019/0387297 A1 | 12/2019 | Shahmurad et al. | |
| 2020/0031337 A1 | 1/2020 | Soltanian et al. | |
| 2020/0064856 A1 | 2/2020 | Silver et al. | |
| 2021/0152969 A1* | 5/2021 | Vilkamo | G01S 5/28 |

OTHER PUBLICATIONS

Bruno Fazenda et al., "Acoustic based safety emergency vehicle detection for intelligent transport systems," 2009 ICCAS-SICE, Fukuoka, 2009, pp. 4250-4255.
International Search Report and Written Opinion for PCT/US2021/042593 dated Nov. 5, 2021.

* cited by examiner

EXTERNAL MICROPHONE ARRAYS FOR SOUND SOURCE LOCALIZATION

CROSS-REFERENCE TO RELATED APPLICATIONS

This application is a continuation of U.S. patent application Ser. No. 16/999,830, filed Aug. 21, 2020, which is incorporated herein by reference.

BACKGROUND

Autonomous vehicles or vehicles operating in an autonomous mode may encounter scenarios in which maneuvers may be undertaken quickly based on unanticipated changes in a surrounding environment. As a non-limiting example, if an emergency vehicle turns on a siren, an autonomous vehicle may responsively steer to the side of the road and stop.

Typically, an autonomous vehicle uses sensors to determine its surrounding environment. For example, the autonomous vehicle could use light detection and ranging (LIDAR) devices, radio detection and ranging (RADAR) devices, and/or cameras to capture data of the environment surrounding the autonomous vehicle. However, some aspects of objects in the autonomous vehicle's surrounding environment may not be readily detected by such sensors. As a non-limiting example, if the flashing lights of an approaching emergency vehicle are not visible, the autonomous vehicle may not be able to readily detect the location of the emergency vehicle. As a result, the ability of the autonomous vehicle to perform maneuvers in response to an approaching emergency vehicle may be adversely affected.

SUMMARY

The present disclosure generally relates to using microphone arrays positioned on a roof of an autonomous vehicle to localize a source of a detected sound, such as a siren sound. In example implementations, microphones of the microphone arrays generate timestamped audio frames of the detected sound. A computing system analyzes the timestamped audio frames from each microphone array to localize the source of the detected sound. As a non-limiting example, using the timestamped audio frames from a first microphone array, the computing system can perform a first operation to determine a difference in time-of-arrival of the detected sound and calculate an azimuth of the source based on the difference. As another non-limiting example, using the timestamped audio frames from a second microphone array, the computing system can perform a second operation to determine a difference in time-of-arrival of the detected sound and calculate an azimuth of the source based on the difference. Similar operations can be performed using timestamped audio frames for additional microphone arrays positioned on the roof. The computing system can further localize or verify the location of the particular source by comparing or analyzing results of the first and second operations.

It should be understood that the techniques described herein can be implemented using various numbers of microphone arrays. For example, the techniques described herein can be implemented using two microphone arrays, three microphone arrays, four microphone arrays, etc. Additionally, the techniques described herein can be implemented using various microphone array configurations. For example, the techniques described herein can be implemented using microphone arrays having two microphones, microphone arrays having three microphones, microphone arrays having four microphones, microphone arrays having a ring of microphones, etc. As used herein, each microphone array is associated with a microphone unit or module that has an internal clock used to generate timestamps.

In a first aspect, a system includes a first microphone array positioned at a first location on an autonomous vehicle. The first microphone array includes a first plurality of microphones, and each microphone of the first plurality of microphones is able to capture a particular sound from a particular source to generate a corresponding audio frame having a timestamp based on a first internal clock associated with the first microphone array. The timestamp is indicative of a time that a corresponding microphone of the first plurality of microphones captured the particular sound. The system also includes a second microphone array positioned at a second location on the autonomous vehicle. The second microphone array includes a second plurality of microphones, and each microphone of the second plurality of microphones is able to capture the particular sound from the particular source to generate a corresponding audio frame having a timestamp based on a second internal clock associated with the second microphone array. The timestamp is indicative of a time that a corresponding microphone of the second plurality of microphones captured the particular sound. The system also includes a processor configured to synchronize the first internal clock with the second internal clock. The processor is further configured to perform a first operation to localize the particular source relative to the autonomous vehicle based on the timestamps of the audio frames generated by the first plurality of microphones. The processor is also configured to perform a second operation to localize the particular source relative to the autonomous vehicle based on the timestamps of the audio frames generated by the second plurality of microphones. The processor is further configured to determine the location of the particular source relative to the autonomous vehicle based on the first operation and the second operation. The processor is also configured to generate a command to maneuver the autonomous vehicle based on the location of the particular source relative to the autonomous vehicle.

In a second aspect, a method includes synchronizing, at a processor, a first internal clock associated with a first microphone array positioned at a first location on an autonomous vehicle with a second internal clock associated with a second microphone array positioned at a second location on the autonomous vehicle. The method also includes receiving an audio frame and a corresponding timestamp from each microphone in the first microphone array. Each audio frame is generated in response to a respective microphone in the first microphone array capturing a particular sound from a particular source, and each timestamp is generated using the first internal clock and is indicative of a time a corresponding microphone in the first microphone array captured the particular sound. The method further includes receiving an audio frame and a corresponding timestamp from each microphone in the second microphone array. Each audio frame is generated in response to a respective microphone in the second microphone array capturing the particular sound from the particular source, and each timestamp is generated using the second internal clock and is indicative of a time a corresponding microphone in the second microphone array captured the particular sound. The method further includes performing a first operation to localize the particular source relative to the autonomous vehicle based on the timestamps of the audio frames generated by the microphones in the first microphone array. The method also includes performing a second operation to localize the particular source relative to the autonomous vehicle based on the timestamps of the audio frames generated by the microphones in the second microphone array. The method further includes determining the location of the particular source relative to the autonomous vehicle based on the first operation and the second operation. The method also includes generating a command to maneuver the autonomous vehicle based on the location of the particular source relative to the autonomous vehicle.

In a third aspect, a non-transitory computer-readable medium stores instructions executable by a computing device to cause the computing device to perform functions. The functions include synchronizing a first internal clock associated with a first microphone array positioned at a first location on an autonomous vehicle with a second internal clock associated with a second microphone array positioned at a second location on the autonomous vehicle. The functions also include receiving an audio frame and a corresponding timestamp from each microphone in the first microphone array. Each audio frame is generated in response to a respective microphone in the first microphone array capturing a particular sound from a particular source, and each timestamp is generated using the first internal clock and is indicative of a time a corresponding microphone in the first microphone array captured the particular sound. The functions further include receiving an audio frame and a corresponding timestamp from each microphone in the second microphone array. Each audio frame is generated in response to a respective microphone in the second microphone array capturing the particular sound from the particular source, and each timestamp is generated using the second internal clock and is indicative of a time a corresponding microphone in the second microphone array captured the particular sound. The functions further include performing a first operation to localize the particular source relative to the autonomous vehicle based on the timestamps of the audio frames generated by the microphones in the first microphone array. The functions also include performing a second operation to localize the particular source relative to the autonomous vehicle based on the timestamps of the audio frames generated by the microphones in the second microphone array. The functions further include determining the location of the particular source relative to the autonomous vehicle based on the first operation and the second operation. The functions also include generating a command to maneuver the autonomous vehicle based on the location of the particular source relative to the autonomous vehicle.

Other aspects, embodiments, and implementations will become apparent to those of ordinary skill in the art by reading the following detailed description, with reference where appropriate to the accompanying drawings.

DETAILED DESCRIPTION

Figure 1:
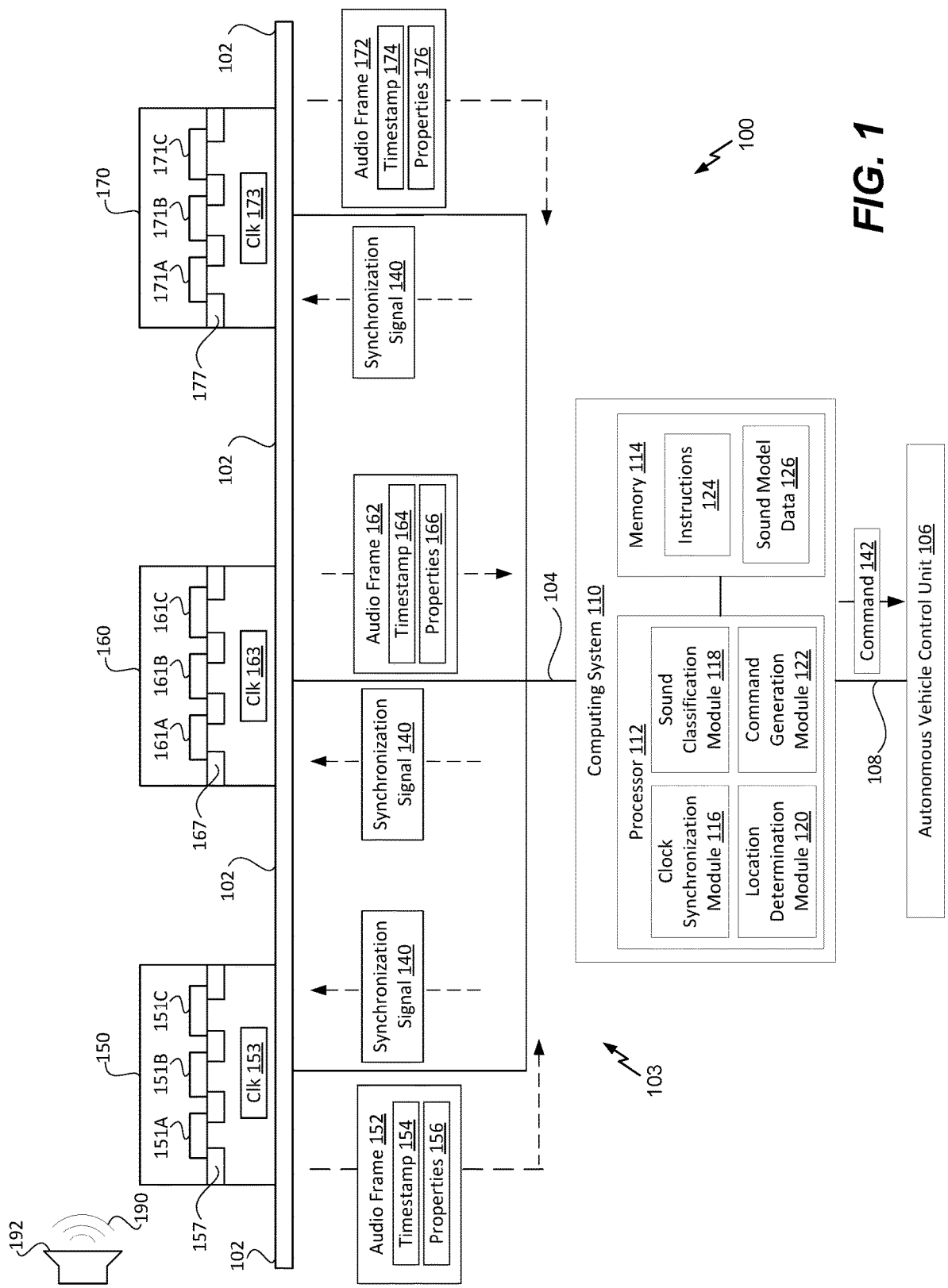
FIG. 1 is a functional diagram illustrating components of an autonomous vehicle, in accordance with an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

The present disclosure generally relates to using microphone arrays mounted on an autonomous vehicle (e.g., positioned on a roof of an autonomous vehicle) to localize a source of a detected sound. For example, a plurality of microphone arrays can be coupled to the roof of the autonomous vehicle at different locations. To illustrate, a left microphone array can be coupled to a left-side location on the roof to capture sound from a left side of the autonomous vehicle, a right microphone array can be coupled to a right-side location on the roof to capture sound from a right side of the autonomous vehicle, and a rear microphone array can be coupled to a rear location on the roof to capture sound behind the autonomous vehicle. Each microphone array can be associated with an independent internal clock that is used to generate a timestamp that indicates a time the respective microphone array captured a sound. A computing system within the autonomous vehicle sends synchronization signals to each internal clock so that the internal clocks associated with each microphone array coupled to the roof are synchronized. According to one implementation, the synchronization can be performed using a Precision Time Protocol (PTP) operation.

The microphone arrays are used in conjunction with the computing system to detect a location of a sound source relative to the autonomous vehicle. As a non-limiting example, if an ambulance is approaching the autonomous vehicle from the back-left side, the left microphone array and the rear microphone array may detect an ambulance siren sound prior to the right microphone array detecting the ambulance siren sound. In part, the left and rear microphone arrays may detect the ambulance siren sound prior to the right microphone array detecting the ambulance siren sound because the left and rear microphone arrays are closer to the ambulance and are somewhat oriented in a direction facing the ambulance. As a result, the left and rear microphone arrays can generate audio frames representative of the captured ambulance siren sound prior to the right microphone array generating audio frames representative of the captured ambulance siren sound. Thus, if the internal clocks are synchronized, the timestamps on the audio frames (for the captured ambulance siren sound) generated by the left and rear microphone arrays should indicate an earlier time than the timestamp on the audio frame (for the captured ambulance siren sound) generated by the right microphone array. The computing system can read the timestamps to determine which microphone arrays are closer to the ambulance, and thus determine the proximate location of the ambulance relative to the autonomous vehicle. For example, the computing system can determine that the ambulance is located to the back-left side of the autonomous vehicle.

In response to determining the location of the ambulance, the computing system can generate commands to maneuver the autonomous vehicle. As non-limiting examples, the computing system can generate a command to steer the autonomous vehicle to the right side of the road, a command to reduce the speed of the autonomous vehicle, etc.

Thus, the microphone arrays coupled to the roof of the autonomous vehicle can be used to localize the ambulance siren sound and determine a location of the ambulance relative to the autonomous vehicle. Moreover, the microphone arrays can be used to determine the location of the ambulance in scenarios where the ambulance is not detected by other sensors (e.g., cameras, lidars, or radars).

It should be appreciated that the sound source localization techniques described herein can be implemented to determine the location of a wide variety of sound types (e.g., honking, sirens, etc.) and sound sources, including emergency vehicles, pedestrians, school busses, other motor vehicles, etc.

II. EXAMPLE EMBODIMENTS

FIG. 1 is a functional diagram illustrating components of an autonomous vehicle 100 in accordance with an example embodiment. The autonomous vehicle 100 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The autonomous vehicle 100 may be configured to operate fully or partially in an autonomous mode. For example, the autonomous vehicle 100 may control itself while in the autonomous mode, and may be operable to determine a current state of the autonomous vehicle 100 and its environment, determine a predicted behavior of at least one other vehicle in the environment, determine a confidence level that may correspond to a likelihood of the at least one other vehicle to perform the predicted behavior, and control the autonomous vehicle 100 based on the determined information. While in the autonomous mode, the autonomous vehicle 100 may be configured to operate without human interaction.

In FIG. 1, a roof 102 of the autonomous vehicle 100 is shown. Three microphone units 150, 160, 170 are coupled to the roof 102 of the autonomous vehicle 100 at various locations. For example, a first microphone unit 150 is positioned at a first location on the roof 102, a second microphone unit 160 is positioned at a second location on the roof 102, and a third microphone unit 170 is positioned at a third location on the roof 102. In an example implementation, the first location associated with first microphone unit 150 corresponds to a left side of the roof 102, the second location associated with the second microphone unit 160 corresponds to a right side of the roof 102, and the third location associated with the third microphone unit 170 corresponds to the rear of the roof 102. It should be understood that in other implementations, additional (or fewer) microphone units can be coupled to the roof 102 of the autonomous vehicles 100 at different locations. For example, in one implementation, four microphone units can be coupled to the roof 102 of the autonomous vehicle 100 at various locations. In another implementation, two microphone units can be coupled to the roof 102 of the autonomous vehicle 100 at various locations. In yet another implementation, a plurality of microphone units can be coupled to the roof 102 in a circular pattern. Thus, the microphone units 150, 160, 170 and their respective locations illustrated and described with respect to FIG. 1 are merely for illustrative purposes and should not be construed as limiting.

The first microphone unit 150 includes a first microphone array 151 and a first internal clock 153. The first microphone array 151 includes a microphone 151A, a microphone 151B, and a microphone 151C. Each microphone 151A-151C is coupled to a microphone board 157 and is positioned over an opening in the microphone board 157. According to the implementation described above, the first microphone array 151 can be located towards the left side of the autonomous vehicle 100 to capture sounds originating from the left side of the autonomous vehicle 100 with a relatively high degree of accuracy.

The second microphone unit 160 includes a second microphone array 161 and a second internal clock 163. The second microphone array 161 includes a microphone 161A, a microphone 161B, and a microphone 161C. Each microphone 161A-161C is coupled to a microphone board 167 and is positioned over an opening in the microphone board 167. According to the implementation described above, the second microphone array 161 can be located towards the right side of the autonomous vehicle 100 to capture sounds originating from the right side of the autonomous vehicle 100 with a relatively high degree of accuracy.

The third microphone unit 170 includes a third microphone array 171 and a third internal clock 173. The third microphone array 171 includes a microphone 171A, a microphone 171B, and a microphone 171C. Each microphone 171A-171C is coupled to a microphone board 177 and is positioned over an opening in the microphone board 177. According to the implementation described above, the third microphone 171 can be located towards the rear of the autonomous vehicle 100 to capture sounds originating from the rear of the autonomous vehicle 100 with a relatively high degree of accuracy.

It should be understood that although three microphones are shown in each microphone array 151, 161, 171, in some implementations, one or more of the microphone arrays 151, 161, 171 can include additional (or fewer) microphones. As a non-limiting example, one or more of the microphone arrays 151, 161, 171 can include two microphones. To illustrate, the microphone array 151 can include a first microphone oriented in a first direction and a second microphone oriented in a second direction that is different from the first direction. As another non-limiting example, one or more of the microphone arrays 151, 161, 171 can include a ring of microphones. To illustrate, the microphone array 151 can include a circular ring of microphones.

Figure 2:
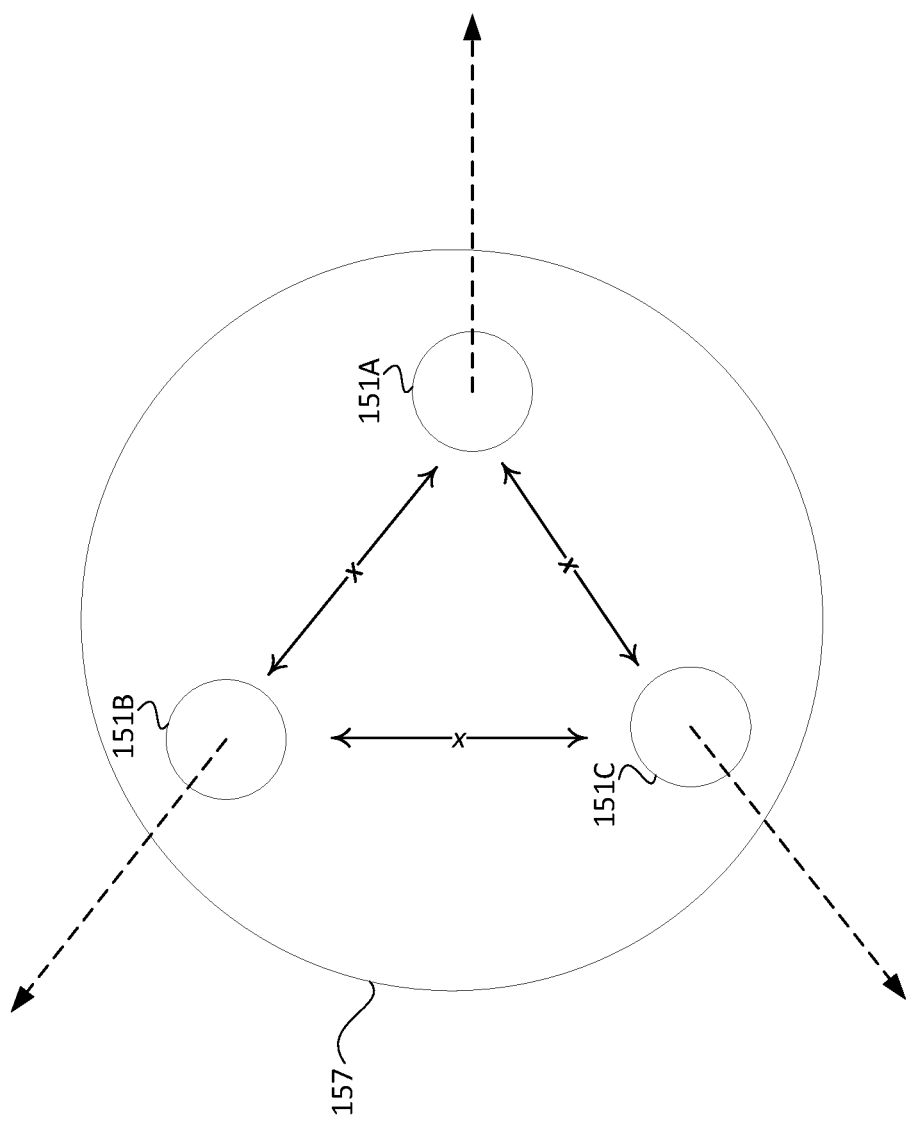
FIG. 2 is a diagram of a microphone array, in accordance with an example embodiment.

According to some implementations, microphones in the microphone arrays can be oriented in different directions for improved sound source localization, as described below. For example, referring to FIG. 2, a non-limiting illustrative example of the microphones 151A-151C coupled to the microphone board 157 is shown. In FIG. 2, the microphone 151A is oriented in a first direction, the microphone 151B is oriented in a second direction that is 120 degrees from the first direction, and the microphone 151C is oriented in a third direction that is 120 degrees from the first direction and 120 degrees from the second direction. For example, in FIG. 2, the microphone 151A is oriented towards 0 degrees, the microphone 151B is oriented towards 120 degrees, and the microphone 151C is oriented towards 240 degrees. Additionally, the microphones 151A-151C can be separated by a particular distance "x". According to one implementation, the particular distance "x" is equal to 6 centimeters. It should be appreciated that the example illustrated in FIG. 2 is for illustrative purposes only and should not be construed as limiting.

Referring back to FIG. 1, each microphone unit 150, 160, 170 is coupled to a computing system 110 via a bus 104. Although illustrated in FIG. 1 as a physical bus 104 (e.g., a wired connection), in some implementations, the bus 104 can be a wireless communication medium that is used to communicate messages and signals between the microphone units 150, 160, 170 and the computing system 110. According to one implementation, the bus 104 is a two-wire interface bus that is connected to a single master device (e.g., the computing system 110) and multiple slave devices (e.g., the microphone units 150, 160, 170). For example, the bus 104 can be an automotive audio bus. As shown in FIG. 1, the computing system 110 can be integrated into a cabin 103 of the autonomous vehicle 100. For example, the computing system 110 can be integrated into a front console or a center console of the autonomous vehicle 100.

The computing system 110 includes a processor 112 that is coupled to a memory 114. The memory 114 can be a non-transitory computer-readable medium that stores instructions 124 that are executable by the processor 112. The processor 112 includes a clock synchronization module 116, a sound classification module 118, a location determination module 120, and a command generation module 122. According to some implementations, one or more of the modules 116, 118, 120, 122 can correspond to software (e.g., instructions 124) executable by the processor 112. According to other implementations, one or more the modules 116, 118, 120, 122 can correspond to dedicated circuitry (e.g., application-specific integrated circuits (ASICs) or field programmable gate arrays (FPGAs)) integrated into the processor 112.

The clock synchronization module 116 is configured to synchronize the first internal clock 153 of the first microphone unit 150 with the second internal clock 163 of the second microphone unit 160 and with the third internal clock 173 of the third microphone unit 170. For example, the clock synchronization module 116 can generate a synchronization signal 140 that is based on a clock (not shown) of the computing system 110. The processor 112 can send the synchronization signal 140 to the first microphone unit 150, to the second microphone unit 160, and to the third microphone unit 170 to synchronize the internal clocks 153, 163, 173 of each microphone unit 150, 160, 170. According to some implementations, the processor 112 can periodically send synchronization signals 140 to each microphone unit 150, 160, 170 to ensure that the internal clocks 153, 163, 173 of the microphone units 150, 160, 170 are synchronized. As a non-limiting example, the processor 112 can send synchronization signals 140 to each microphone unit 150, 160, 170 every M clock cycles, where M is any integer value.

At least one microphone 151A-151C in the first microphone array 151 is configured to capture a particular sound 190 to generate a first audio frame 152. For example, the microphone 151A is configured to capture the particular sound 190 to generate the first audio frame 152. The first audio frame 152 can include a first timestamp 154 and first audio properties 156. For example, the first microphone unit 150 can generate the first timestamp 154 using the first internal clock 153 associated with the microphone 151A. The first timestamp 154 is indicative of a time that the microphone 151A captured the particular sound 190. The first audio properties 156 can correspond to at least one of frequency characteristics of the particular sound 190 as captured by the microphone 151A, pitch characteristics of the particular sound 190 as captured by the microphone 151A, reverberation characteristics of the particular sound 190 as captured by the microphone 151A, etc. The first microphone unit 150 is configured to send the first audio frame 152 to the computing system 110 via the bus 104 in response to generating the first audio frame 152. It should be understood that upon detection of the particular sound 190, in a similar manner as the microphone 151A, the microphones 151B, 151C can capture the particular sound 190 and generate audio frames with corresponding timestamps.

At least one microphone 161A-161C in the second microphone array 161 is configured to capture the particular sound 190 to generate a second audio frame 162. For example, the microphone 161A is configured to capture the particular sound 190 to generate the second audio frame 162. The second audio frame 162 can include a second timestamp 164 and second audio properties 166. For example, the second microphone unit 160 can generate the second timestamp 164 using the second internal clock 163 associated with the microphone 161A. The second timestamp 164 is indicative of a time that the microphone 161A captured the particular sound 190. The second audio properties 166 can correspond to at least one of frequency characteristics of the particular sound 190 as captured by the microphone 161A, pitch characteristics of the particular sound 190 as captured by the microphone 161A, reverberation characteristics of the particular sound 190 as captured by the microphone 161A, etc. The second microphone unit 160 is configured to send the second audio frame 162 to the computing system 110 via the bus 104 in response to generating the second audio frame 162. It should be understood that upon detection of the particular sound 190, in a similar manner as the microphone 161A, the microphones 161B, 161C can capture the particular sound 190 and generate audio frames with corresponding timestamps.

At least one microphone 171A-171C in the third microphone array 171 is configured to capture the particular sound 190 to generate a third audio frame 172. For example, the microphone 171A is configured to capture the particular sound 190 to generate the third audio frame 172. The third audio frame 172 can include a third timestamp 174 and third audio properties 176. For example, the third microphone unit 170 can generate the third timestamp 174 using the third internal clock 173 associated with the microphone 171A. The third timestamp 174 is indicative of a time that the microphone 171A captured the particular sound 190. The third audio properties 176 can correspond to at least one of frequency characteristics of the particular sound 190 as captured by the microphone 171A, pitch characteristics of the particular sound 190 as captured by the microphone 171A, reverberation characteristics of the particular sound 190 as captured by the microphone 171A, etc. The third microphone unit 170 is configured to send the third audio frame 172 to the computing system 110 via the bus 104 in response to generating the third audio frame 172. It should be understood that upon detection of the particular sound 190, in a similar manner as the microphone 171A, the microphones 171B, 171C can capture the particular sound 190 and generate audio frames with corresponding timestamps.

The processor 112 is configured to receive the audio frames 152, 162, 172 from the microphone units 150, 160, 170, respectively, via the bus 104. Upon reception of the audio frames 152, 162, 172, the sound classification module 118 is configured to determine (or classify) a particular source 192 of the particular sound 190. For example, the sound classification module 118 can determine whether the particular source 192 is an emergency vehicle, a pedestrian, an ice cream truck, another motor vehicle, etc.

For ease of explanation, the sound classification module 118 is described below as determining whether the particular source 192 of the particular sound 190 is an emergency vehicle. As non-limiting examples, the sound classification module 118 is described as determining whether the particular source 192 is a police car siren, an ambulance siren, a fire truck siren, etc. As described below, detection of a sound associated with an emergency vehicle may necessitate maneuvering the autonomous vehicle 100 (e.g., pulling the autonomous vehicle 100 to the side of the road, reducing the speed of the autonomous vehicle 100, etc.)

Although the description is directed to determining whether the particular source 192 is an emergency vehicle, it should be appreciated that the classification techniques described herein can be implemented to classify the particular source 192 in scenarios where the particular source 192 is not an emergency vehicle. As a non-limiting example, the sound classification module 118 could determine whether the particular source 192 is a train, which, if true, may necessitate stopping the autonomous vehicle 100. As another non-limiting example, the sound classification module 118 could determine whether the particular source 192 is a child, which, if true, may also necessitate stopping the autonomous vehicle 100. Nevertheless, for ease of description, the following examples are directed towards determining whether the particular source 192 is an emergency vehicle.

To determine whether the particular source 192 is an emergency vehicle, the sound classification module 118 can compare the first audio properties 156 of the first audio frame 152 to a plurality of sound models associated with emergency vehicle sounds. To illustrate, sound model data 126 is stored in the memory 114 and is accessible to the processor 112. The sound model data 126 can include a sound model dataset for different emergency vehicles sounds. As non-limiting examples, the sound model data 126 can include a sound model dataset for police car sirens, a sound model dataset for ambulance sirens, a sound model dataset for fire truck sirens, etc. The sound model data 126 can be continuously updated using machine learning or by a remote transfer of sound model datasets from a manufacturer.

The sound classification module 118 can compare the first audio properties 156 of the first audio frame 152 to each sound model dataset to determine a similarity score. The similarity score can be based on at least one of (i) similarities between the frequency characteristics indicated in the first audio properties 156 and frequency characteristics of a selected sound model dataset, (ii) similarities between the pitch characteristics indicated in the first audio properties 156 and pitch characteristics of the selected sound model dataset, (iii) similarities between the reverberation characteristics indicated in the first audio properties 156 and reverberation characteristics of the selected sound model dataset, etc. If the similarity score for the selected sound model dataset is above a particular threshold, the sound classification module 118 can determine that the particular source 192 is a corresponding emergency vehicle.

To illustrate, if the similarity score is above the particular threshold upon a comparison of the first audio properties 156 and a sound model dataset associated with an ambulance siren, the sound classification module 118 can determine that the particular source 192 is an emergency vehicle (e.g., an ambulance). However, if the sound classification module 118 compares the first audio properties 156 to each sound model dataset associated with emergency vehicles (or associated with any other sound source that may necessitate maneuvering the autonomous vehicle 100) and there is not a resulting similarity score that is above the particular threshold, the sound classification module 118 can determine that the particular source 192 is not an emergency vehicle and can disregard the particular sound 190. In a similar manner, the sound classification module 118 can compare the second audio properties 166 of the second audio frame 162 and the third audio properties 176 of the third audio frame 172 to the plurality of sound models associated with emergency vehicle sounds.

In some implementations, prior to comparing the audio properties 156, 166, 176 to the plurality of sound models, the first audio properties 156 of the first audio frame 152 are compared to the second and third audio properties 166, 176 of the second and third audio frames 162, 172 to ensure that audio frames corresponding to the same sound (e.g., the particular sound 190) are being compared to the plurality of sound models. For example, the processor 112 can be configured to determine whether the first audio frame 152 and the second audio frame 162 both capture the particular sound 190 from the particular source 192. If a deviance between the audio properties 156, 166 is larger than a threshold deviance, the sound classification module 118 can bypass use of the audio frames 152, 162 to classify the particular source 192 of the particular sound 190 and use subsequent audio frames from the microphone units 150, 160 that have a smaller deviance.

It should be appreciated that comparing the audio properties 166, 176 of the other audio frames 160, 170 to the plurality of sound models may reduce the likelihood of false positives. For example, if the comparison based on the first audio properties 156 of the first audio frame 152 resulted in a determination that the particular source 192 is an emergency vehicle and the comparisons based on the other audio properties 166, 176 of the other audio frames 162, 172 resulted in a determination that the particular source 192 is not an emergency vehicle, the sound classification module 118 may determine that a false positive may exist. As a result of the potential false positive, comparisons based on audio properties of additional (e.g., subsequent) audio frames generated by the microphone units 150, 160, 170 may be performed to classify the particular source 192 of the particular sound 190.

According to one implementation, in response to classifying the particular source 192 of the particular sound 190, the location determination module 120 is configured to determine a location of the particular source 192 relative to the autonomous vehicle 100 based on the timestamps 154, 164, 174 of the audio frames 152, 162, 172. The location of the particular source 192 relative to the autonomous vehicle 100 can be determined based on a determination of which microphone array 151, 161, 171 first detected the particular sound 190.

To illustrate, as mentioned above, each microphone array 151, 161, 171 is positioned at different locations on the roof 102 and each microphone 151A-151C, 161A-161C, 171A-171C can be oriented in a different direction. Using the non-limiting example described above, the microphone 151A is located at the left side of the roof 102 and is facing left, the microphone 161A is located at the right side of the roof 102 and is facing right, and the microphone 171A is located at the rear of the roof 102 and is facing the rear of the autonomous vehicle 100. The microphone that is closest to, and oriented towards, the particular source 192 will likely detect the particular sound 190 prior to the microphones that are further from, and oriented away from, the particular source 192. For ease of description and illustration, assume that the particular source 192 is approaching the autonomous vehicle from the front-left side such that the microphone 151A is closer to the particular source 192 than the microphone 161A, and the microphone 161A is closer to the particular source 192 than the microphone unit 171A. In this scenario, the microphone 151A would likely detect the particular sound 190 and generate the first audio frame 152 prior to the microphone 161A detecting the particular sound 190 and generating the second audio frame 162. As a result, the first timestamp 154 of the first audio frame 152 would indicate an earlier time than the second timestamp 164 of the second audio frame 162. Additionally, in the above scenario, the microphone 161A would likely detect the particular sound 190 and generate the second audio frame 162 prior to the microphone 171A detecting the particular sound 190 and generating the third audio frame 172. As a result, the second timestamp 164 of the second audio frame 162 would indicate an earlier time than the third timestamp 174 of the third audio frame 172.

The location determination module 120 determines the location of the particular source 192 relative to the autonomous vehicle 100 based on a comparison of the timestamps 154, 164, 174. For example, in response to determining that the first timestamp 154 is indicative of a time that is earlier than the other timestamps 164, 174, the location determination module 120 can determine that the particular source 192 is approaching from a side of the autonomous vehicle 100 proximate to the first location of the first microphone unit 150 as opposed to from sides proximate to the locations of the other microphone units 160, 170.

Figure 4:
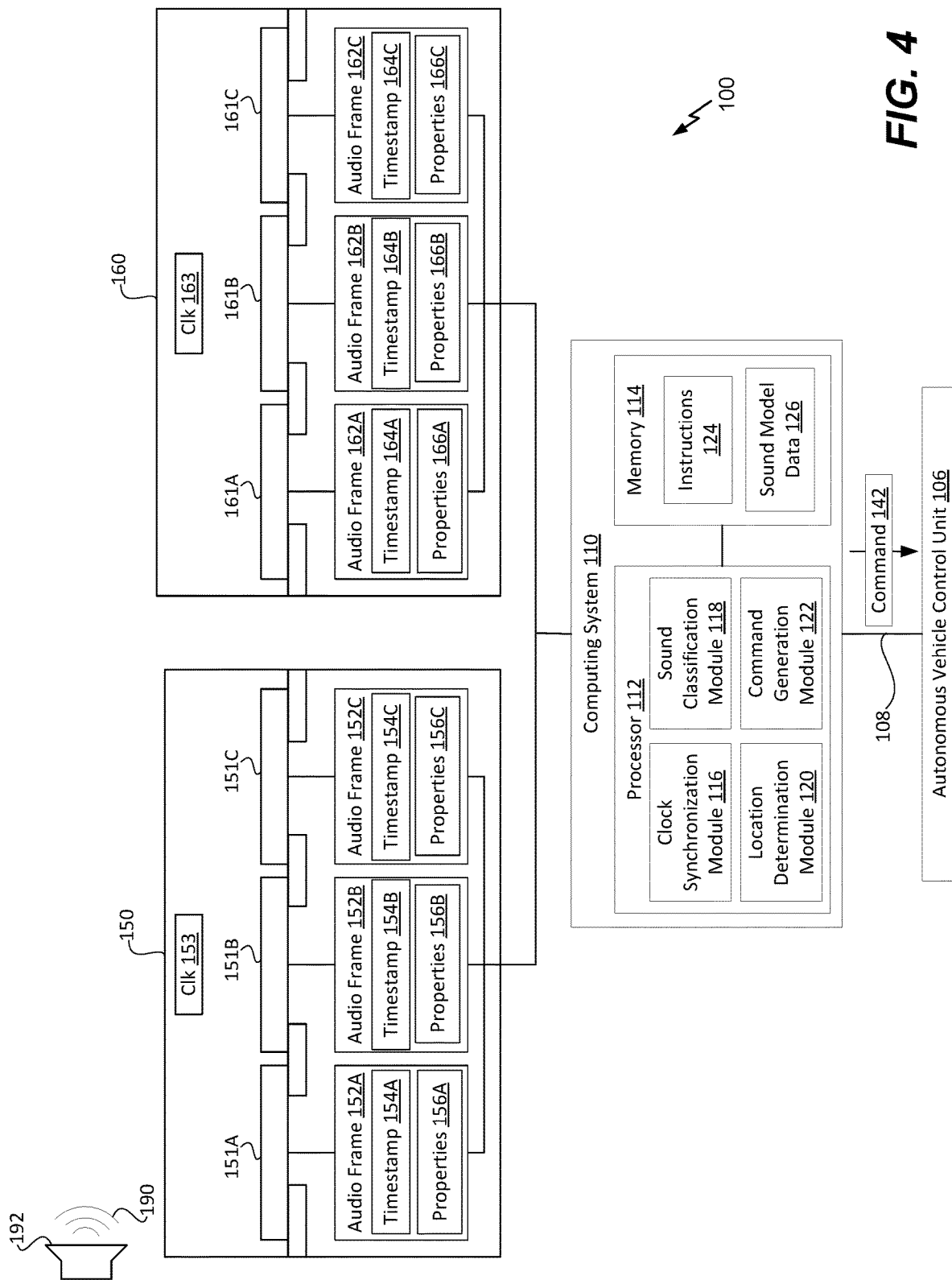
FIG. 4 is another functional diagram illustrating components of an autonomous vehicle, in accordance with an example embodiment.

As described with respect to FIG. 4, in some implementations, using the timestamps of an individual microphone unit, the processor 112 can perform operations to determine the location of the particular source 192 relative to autonomous vehicle 100. Upon determining the location of the particular source 192 based on the timestamps for each individual microphone unit, the processor 112 can determine the location of the particular source 192 based on the individualized determinations.

The command generation module 122 is configured to generate a command 142 to maneuver the autonomous vehicle 100 based on the location of the particular source 192. As a non-limiting example, if the location determination module 120 indicates that the location of the particular source 192 is to the front-left side of the autonomous vehicle 100, the command generation module 122 can generate a command 142 to navigate the autonomous vehicle 100 to the right side of the road. Additionally, or in the alternative, the command generation module 122 can generate a command 142 to reduce the speed of the autonomous vehicle 100.

The command generation module 122 can send the command 142 to an autonomous vehicle control unit 106 via a bus 108. The autonomous vehicle control unit 106 can be coupled to control different components of the autonomous vehicle 100, such as the steering wheel, the brakes, the accelerator, the turn signals, etc. Based on the command 142, the autonomous vehicle control unit 106 can send signals to the different components of the autonomous vehicle 100. For example, the autonomous vehicle control unit 106 can send a signal to enable the steering wheel to maneuver the autonomous vehicle 100 to the side of the road, the autonomous vehicle control unit 106 can send a signal to enable the brakes to reduce the speed (or stop) the autonomous vehicle 100, etc.

According to one implementation, the command generation module 122 can generate a command 142 to change a mode of the autonomous vehicle 100 into a user assist mode in response to determining the location of the particular source 192. In this implementation, in response to receiving the command 142, the autonomous vehicle control unit 106 can send signals to components of the autonomous vehicle 100 to disable an autonomous mode of operation so that a driver can control operation of the autonomous vehicle 100.

The techniques described with respect to FIG. 1 enable sound source localization using the microphone arrays 151, 161, 171 positioned at different locations on the roof 102 of the autonomous vehicle 100. For example, based on timestamps 154, 164, 174 indicating when a respective microphone array 151, 161, 171 captures the particular sound 190, the computing system 110 can determine the location of the particular source 192 and generate commands to maneuver the autonomous vehicle 100 based on the location of the particular source 192 relative to the autonomous vehicle 100. Thus, the positions and orientations of the microphone arrays 151, 161, 171 are used to localize the particular source 192.

Figure 3:
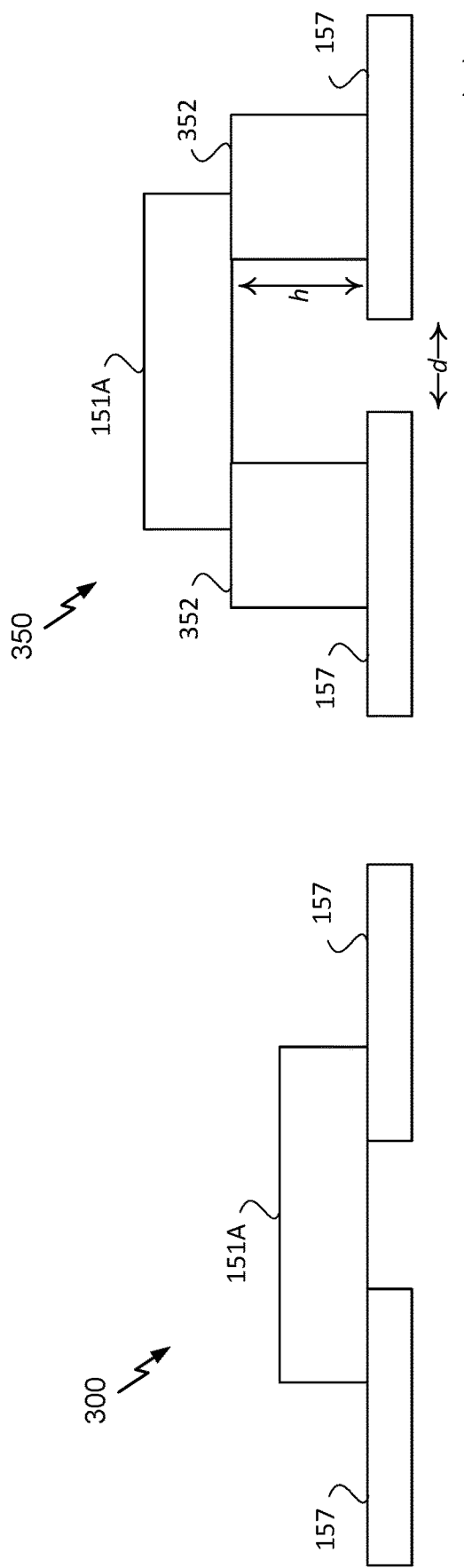
FIG. 3 depicts diagrams of a microphone coupled to a microphone board in accordance with example embodiments.

FIG. 3 depicts diagrams of a microphone coupled to a microphone board in accordance with example embodiments. For example, FIG. 3 depicts a first example 300 of a microphone coupled to a microphone board and a second example 350 of a microphone coupled to a microphone board.

According to the first example 300, the microphone 151A is directly coupled to the microphone board 157 and is positioned over an opening in the microphone board 157. It should be understood that the configuration in the first example 300 can be applied to any of the microphones described with respect to FIG. 1. In the first example 300, there is a strong flush to support improved acoustics.

According to the second example 350, the microphone 151A is coupled to an object 352 (e.g., metal, plastic, etc.), and the object 352 is coupled to the microphone board 157. In the second example 350, the height (h) of the object 352 is greater than the distance (d) of the opening in the microphone board 157. As a result, in the second example 350, there is a stronger acoustic flush than the first example 300, resulting in even greater acoustics. It should be understood that the configuration in the second example 350 can be applied to any of the microphones described with respect to FIG. 1.

FIG. 4 is another functional diagram illustrating components of the autonomous vehicle 100 in accordance with an example embodiment. In particular, FIG. 4 illustrates the microphone unit 150, the microphone unit 160, the computing system 110, and the autonomous vehicle control unit 106. It should be understood that additional microphone units, such as the microphone unit 170, can be included in techniques described with respect to FIG. 4. It should also be understood that the number of microphones in each microphone unit 150, 160 can vary based on implementation.

In FIG. 4, each microphone of the first microphone array 151 is configured to capture the particular sound 190 from the particular source 192 to generate a corresponding audio frame having a timestamp that is based on the first internal clock 153. For example, the microphone 151A is configured to capture the particular sound 190 from the particular source 192 to generate an audio frame 152A having a timestamp 154A that is based on the first internal clock 153, the microphone 151B is configured to capture the particular sound 190 from the particular source 192 to generate an audio frame 152B having a timestamp 154B that is based on the first internal clock 153, and the microphone 151C is configured to capture the particular sound 190 from the particular source 192 to generate an audio frame 152C having a timestamp 154C that is based on the first internal clock 153. Because the microphones 151A-151C are oriented in different directions and have different positions, as illustrated in FIG. 2, the microphones 151A-151C capture the particular sound 190 at slightly different times such that the times indicated by the timestamps 154A-154C are slightly different. The audio frames 152A-152C include audio properties 156A-156C of the particular sound 190 as captured by the microphones 151A-151C, respectively. Among other properties, the audio properties 156A-156C include a sound level of the particular sound 190.

In a similar manner, each microphone of the second microphone array 161 is configured to capture the particular sound 190 from the particular source 192 to generate a corresponding audio frame having a timestamp based on the second internal clock 163. For example, the microphone 161A is configured to capture the particular sound 190 from the particular source 192 to generate an audio frame 162A having a timestamp 164A that is based on the second internal clock 163, the microphone 161B is configured to capture the particular sound 190 from the particular source 192 to generate an audio frame 162B having a timestamp 164B that is based on the second internal clock 163, and the microphone 161C is configured to capture the particular sound 190 from the particular source 192 to generate an audio frame 162C having a timestamp 164C that is based on the second internal clock 163. Because the microphones 161A-161C are oriented in different directions and have different positions, the microphones 161A-161C capture the particular sound 190 at slightly different times such that the times indicated by the timestamps 164A-164C are slightly different. The audio frames 162A-162C include audio properties 166A-166C of the particular sound 190 as captured by the microphones 161A-161C, respectively. Among other properties, the audio properties 166A-166C include a sound level of the particular sound 190.

The processor 112 is configured to perform a first operation to localize the particular source 192 relative to the autonomous vehicle 100 based on the timestamps 154A-154C associated with the first microphone unit 150. To perform the first operation, the processor 112 is configured to determine whether each audio frame 152A-152C captures the particular sound 190 from the particular source 192. For example, the processor 112 can compare the audio properties 156A-156C of the audio frames 152A-152C to each other and to the sound model data 126 to determine that each audio frame 152A-152C captures the particular sound 190, as described with respect to FIG. 1. Upon determining that each audio frame 152A-152C captures the particular sound 190, the processor 112 is configured to compare the timestamps 154A-154C of each audio frame 152A-152C to determine a particular microphone in the first microphone array 151 that first captured the particular sound 190. For example, the processor 112 may determine which timestamp indicates the earliest time to determine the particular microphone that first captured the particular sound 190.

For the purposes of description, assume that the timestamp 154A indicates an earlier time than the timestamps 154B, 154C. Based on this assumption, the processor 112 is configured to localize the particular source 192 relative to the autonomous vehicle 100 based on a property of the microphone 151A compared to properties of the other microphones 151B, 151C. According to one implementation, the property of the microphone 151A can correspond to a location of the microphone 151A. Thus, if the microphones 151A-151C are positioned as illustrated in FIG. 2, the processor 112 can localize the particular source 192 as closer to the location of the microphone 151A than the locations of the microphones 151B, 151C. According to another implementation, the property of the microphone 151A can correspond to an orientation of the microphone 151A. Thus, if the microphones 151A-151C are oriented as illustrated in FIG. 2, the processor 112 can localize the angle of arrival of the particular sound 190 to be proximate to 0 degrees. According to some implementations, using the timestamps 154A-154C, the processor 112 can determine a difference in time-of-arrival of the particular sound 190 and calculate an azimuth of the particular source 192 based on the difference.

The processor 112 is also configured to perform a second operation to localize the particular source 192 relative to the autonomous vehicle based on the timestamps 164A-164C associated with the second microphone unit 160. To perform the second operation, the processor 112 is configured to determine whether each audio frame 162A-162C captures the particular sound 190 from the particular source 192. For example, the processor 112 can compare the audio properties 166A-166C of the audio frames 162A-162C to each other and to the sound model data 126 to determine that each audio frame 162A-162C captures the particular sound 190, as described with respect to FIG. 1. Upon determining that each audio frame 162A-162C captures the particular sound 190, the processor 112 is configured to compare the timestamps 164A-164C of each audio frame 162A-162C to determine a particular microphone in the second microphone array 161 that first captured the particular sound 190. For example, the processor 112 may determine which timestamp indicates the earliest time to determine the particular microphone that first captured the particular sound 190.

For the purposes of description, assume that the timestamp 164B indicates an earlier time than the timestamps 164A, 164C. Based on this assumption, the processor 112 is configured to localize the particular source 192 relative to the autonomous vehicle 100 based on a property of the microphone 161B compared to properties of the other microphones 161A, 161C. According to one implementation, the property of the microphone 161B can correspond to a location of the microphone 161B. According to another implementation, the property of the microphone 161B can correspond to an orientation of the microphone 161B. According to some implementations, using the timestamps 164A-164C, the processor 112 can determine a difference in time-of-arrival of the particular sound 190 and calculate an azimuth of the particular source 192 based on the difference.

The processor 112 is further configured to determine the location of the particular source 192 relative to the autonomous vehicle 100 based on the first operation and the second operation. For example, in response to determining that the earliest timestamp 154A from the first microphone array 151 is associated with the microphone 151A and the earliest timestamp 164B from the second microphone array 161 is associated with the microphone 161B, the processor 112 can further localize the particular source 192 relative to the autonomous vehicle 100 based on the properties of the microphones 151A, 161B. For example, the orientation of microphones 151A, 161B can be used by the processor 112 to determine an angle of arrival of the particular sound 190. To illustrate, if the orientation of the microphone 151A indicates that the angle of arrival of the particular sound 190 is 0 degrees and the orientation of the microphone 161B indicates that the angle of arrival of the particular sound 190 is 10 degrees, the processor 112 can localize the particular source 192 to 5 degrees. In a similar manner, the processor 112 can localize the particular source 192 based on the locations of the microphones 151A, 161B.

According to one implementation, the processor 112 can determine a distance of the particular source 192 from the autonomous vehicle 100 based on the sound level (e.g., the audio properties 156A, 166B) of the audio frames 152A, 162B. For example, the processor 112 can determine a first operation distance based on the sound level of the audio frame 152A and a second operation distance based on the sound level of the audio frame 162B. In response to determining the distance based on the sound levels of the audio frames 152A, 162B individually, the processor 112 can input the first and second operation distances into an algorithm to determine the distance of the particular source 192 from the autonomous vehicle 100. In some implementations, the distance can be equal to a mean (e.g., an average) distance of the individual distances.

The techniques described with respect to FIG. 4 enable sound source localization using the microphone arrays 151, 161 positioned at different locations on the roof 102 of the autonomous vehicle 100. For example, based on timestamps 154A-154C, 164A-164C indicating when the respective microphones 151A-151C, 161A-161C captures the particular sound 190, the computing system 110 can determine the location of the particular source 192. For example, the computing system 110 can determine which microphones 151A, 161B in each microphone unit 150, 160 first captured the particular sound 190 and determine the location of the particular source 192 based on properties (e.g., orientation and position) of the microphones 151A, 161B compared to properties of the other microphones.

Figure 5:
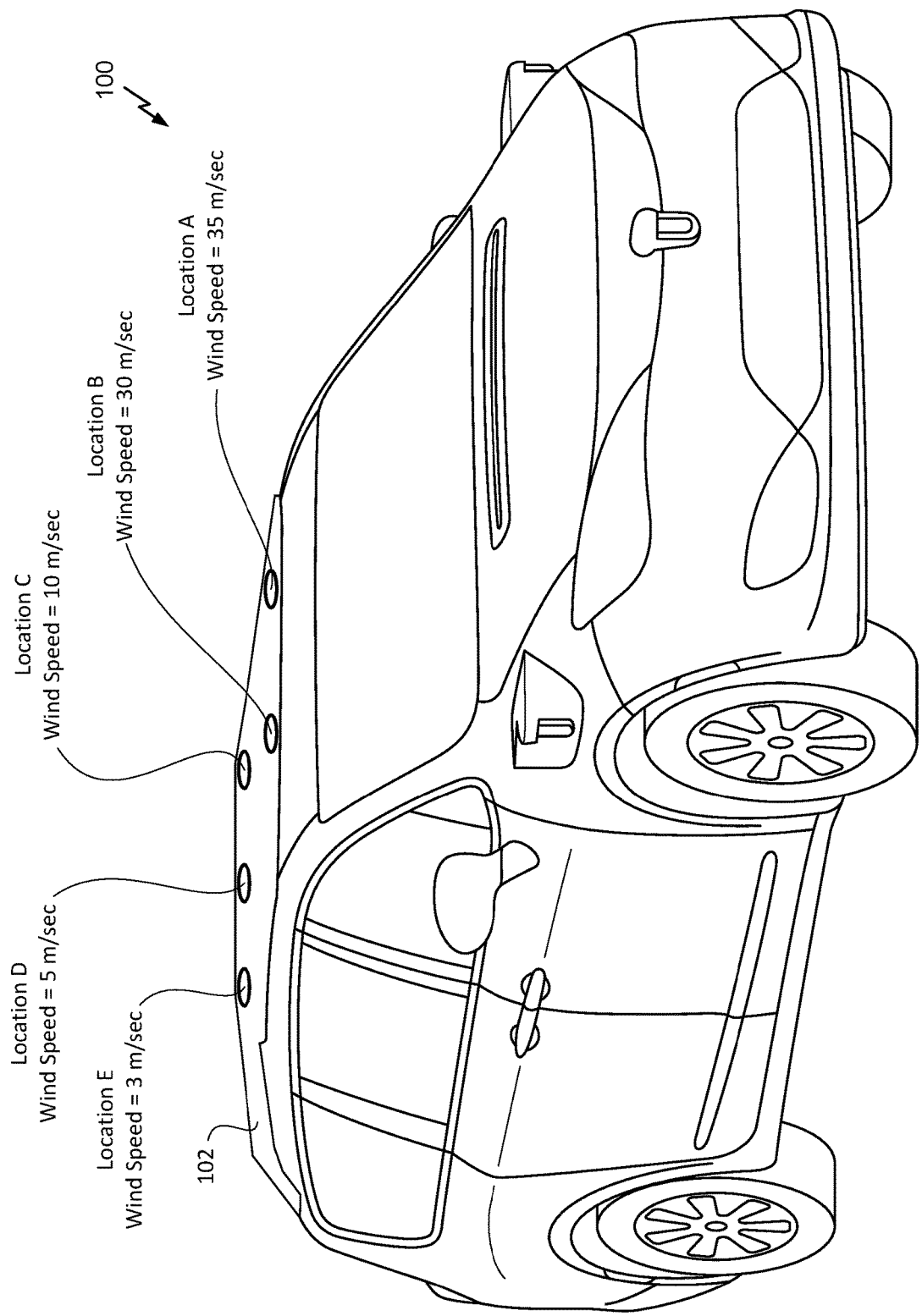
FIG. 5 depicts a diagram of different roof locations to couple a microphone unit in accordance with example embodiments.

FIG. 5 depicts a diagram of different roof locations to couple a microphone unit in accordance with example embodiments. In FIG. 5, different locations (e.g., Location A-Location E) on the roof 102 are depicted as potential places to couple microphone units, such as the microphone units 150, 160, 170. It should be understood that the locations depicted in FIG. 5 are merely for illustrative purposes and should not be construed as limiting. According to some implementations, microphone units are placed in a circular ring around the roof 102 for improved sound source localization.

The locations for the microphone units can be determined based on detected wind speeds. For example, in scenarios where limited microphone units are available, the microphone units can be coupled to the roof 102 at locations with a relatively low wind speed. Simulation data can be generated to detect the wind speeds at different locations. For example, during a simulation, sensors can be placed on the roof 102 of the autonomous vehicle 100 to detect the various wind speeds at different locations. According to the non-limiting illustrative example in FIG. 5, Location A has a wind speed of 35 meters per second (m/sec), Location B has a wind speed of 30 m/sec, Location C has a wind speed of 10 m/sec, Location D has a wind speed of 5 m/sec, and Location E has a wind speed of 3 m/sec. Thus, according to the non-limiting illustrative example in FIG. 5, Location E is a relatively good place to couple a microphone unit, Location D is the second best place to couple a microphone unit, Location C is the third best place to couple a microphone unit, Location B is the next best place to couple a microphone unit, and Location A is the worst place to couple a microphone unit.

It should be understood that selected locations for the microphone units can vary based on the structure of an autonomous vehicle. Thus, different models of autonomous vehicles can have different preferred locations for coupling the microphone units to the roof.

III. EXAMPLE METHODS

Figure 6:
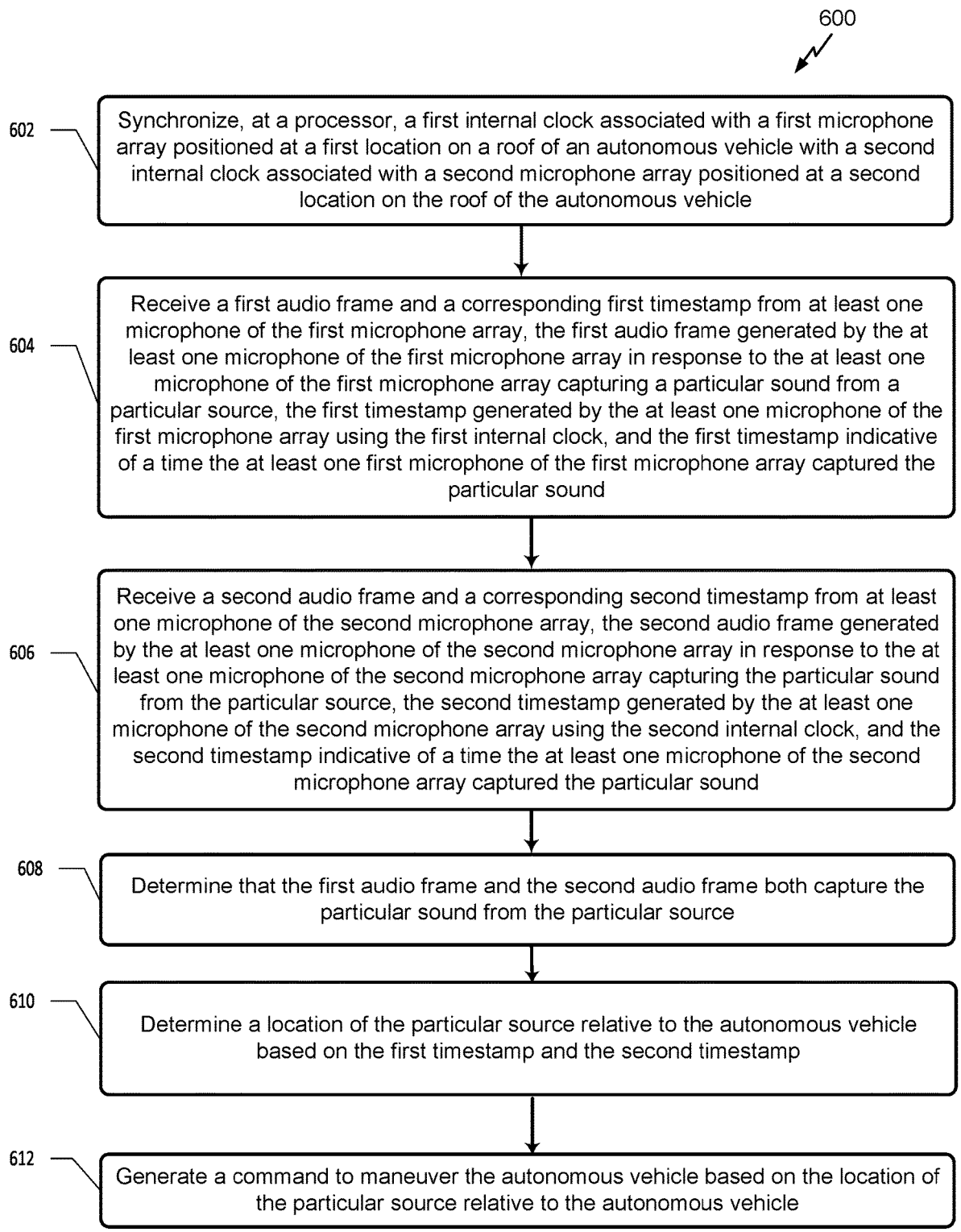
FIG. 6 is a flowchart of a method, according to an example embodiment.

FIG. 6 is a flowchart of a method 600 according to an example embodiment. The method 600 can be performed by the microphone units 150, 160, 170, the computing system 110, or a combination thereof.

The method 600 includes synchronizing, at a processor, a first internal clock associated with a first microphone array positioned at a first location on a roof of an autonomous vehicle with a second internal clock associated with a second microphone array positioned at a second location on the roof of the autonomous vehicle, at 602. For example, referring to FIG. 1, the clock synchronization module 116 sends the synchronization signals 140 to the internal clocks 153, 163 to synchronize the internal clocks 153, 163. It should be appreciated that synchronizing the internal clocks 153, 163 enables the location determination module 120 to relatively accurately determine which audio frame 152, 162 was generated first based on the timestamps 154, 164. If the internal clocks 153, 163 were not synchronized, a degree of error could be introduced such that later generated audio frames have earlier timestamps than earlier generated audio frames.

The method 600 also includes receiving a first audio frame and a corresponding first timestamp from at least one microphone of the first microphone array, at 604. For example, referring to FIG. 1, the processor 112 receives the first audio frame 152 (including the first timestamp 154) from the microphone 151A positioned at the first location on the roof 102 of the autonomous vehicle 100. The first audio frame 152 is generated by the microphone 151A in response to the microphone 151A capturing the particular sound 190 from the particular source 192. The first timestamp 154 is generated by the microphone 151A (e.g., the first microphone unit 150) using the first internal clock 153. The first timestamp 154 is indicative of a time the microphone 151A captured the particular sound 190.

The method 600 also includes receiving a second audio frame and a corresponding second timestamp from at least one microphone of the second microphone array, at 606. For example, referring to FIG. 1, the processor 112 receives the second audio frame 162 (including the second timestamp 164) from the microphone 161A positioned at the second location on the roof 102 of the autonomous vehicle 100. The second audio frame 162 is generated by the microphone 161A in response to the microphone 161A capturing the particular sound 190 from the particular source 192. The second timestamp 164 is generated by the microphone 161A (e.g., the second microphone unit 160) using the second internal clock 163. The second timestamp 164 is indicative of a time the second microphone 161 captured the particular sound 190.

The method 600 also includes determining that the first audio frame and the second audio frame both capture the particular sound from the particular source, at 608. For example, referring to FIG. 1, prior to comparing the audio properties 156, 166, 176 to the plurality of sound models, the first audio properties 156 of the first audio frame 152 are compared to the second and third audio properties 166, 176 of the second and third audio frames 162, 172 to ensure that audio frames corresponding to the same sound (e.g., the particular sound 190) are being compared to the plurality of sound models. The processor 112 uses the comparison to determine that the first audio frame 152 and the second audio frame 162 capture the particular sound 190 from the particular source 192. If a deviance between the audio properties 156, 166 is larger than a threshold deviance, the sound classification module 118 can bypass use of the audio frames 152, 162 to classify the particular source 192 of the particular sound 190 and use subsequent audio frames from the microphone units 150, 160 that have a smaller deviance.

The method 600 also includes determining a location of the particular source relative to the autonomous vehicle based on the first timestamp and the second timestamp, at 610. For example, referring to FIG. 1, the location determination module 120 determines the location of the particular source 190 based on the first timestamp 154 and the second timestamp 164 in response to a determination (by the sound classification module 118) that the particular sound 190 is associated with the emergency vehicle.

To illustrate, using the non-limiting example described above, the microphone 151A of the first microphone array 151 is located at the left side of the roof 102 and is facing left, the microphone 161A of the second microphone array 161 is located at the right side of the roof 102 and is facing right, and the microphone 171A of the third microphone array 171 is located at the rear of the roof 102 and is facing the rear of the autonomous vehicle 100. The microphone that is closest to and oriented towards the particular source 192 will likely detect the particular sound 190 prior to the microphones that are further from the emergency vehicle. For ease of description and illustration, assume that the particular source 192 is approaching the autonomous vehicle from the front-left side such that the microphone 151A is closer to the particular source 192 than the microphone 161A, and the microphone 161A is closer to the particular source 192 than the microphone 171A. In this scenario, the microphone 151A would likely detect the particular sound 190 and generate the first audio frame 152 prior to the microphone 161A detecting the particular sound 190 and generating the second audio frame 162. As a result, the first timestamp 154 of the first audio frame 152 would indicate an earlier time than the second timestamp 164 of the second audio frame 162. Additionally, in the above scenario, the microphone 161A would likely detect the particular sound 190 and generate the second audio frame 162 prior to the microphone 171A detecting the particular sound and generating the third audio frame 172. As a result, the second timestamp 164 of the second audio frame 162 would indicate an earlier time than the third timestamp 174 of the third audio frame 172.

The location determination module 120 determines the location of the particular source 192 relative to the autonomous vehicle 100 based on a comparison of the timestamps 154, 164, 174. For example, in response to determining that the first timestamp 154 is indicative of a time that is earlier than the other timestamps 164, 174, the location determination module 120 determines that the particular source 192 is approaching from (or is located more proximate to) the first location of the first microphone array 151 than the locations of the other microphone arrays 161, 171.

The method 600 also includes generating a command to maneuver the autonomous vehicle based on the location of the particular source relative to the autonomous vehicle, at 612. For example, referring to FIG. 1, the command generation module 122 generates the command 142 that is sent to the autonomous vehicle control unit 106. The command 142 instructs the autonomous vehicle control unit 106 to maneuver the autonomous vehicle 100 based on the location of the particular source 192. According to one implementation of the method 600, the command 142 to maneuver the autonomous vehicle 100 includes a command to reduce a speed of the autonomous vehicle 100. According to another implementation of the method 600, the command 142 to maneuver the autonomous vehicle 100 includes a command to navigate the autonomous vehicle 100 to a side of the road. According to yet another implementation of the method 600, the command 142 to maneuver the autonomous vehicle 100 includes a command to change a mode of the autonomous vehicle 100 into a user assist mode.

According to one implementation, the method 600 also includes determining, based on the first audio frame and the second audio frame, whether the particular sound is associated with an emergency vehicle. For example, referring to FIG. 1, the sound classification module 118 can determine whether the particular sound 190 is associated with an emergency vehicle based on the first audio frame 152 and the second audio frame 162. According to one implementation of the method 600, the sound classification module 118 compares the first audio properties 156 of the first audio frame 152 and the second audio properties 166 of the second audio frame 162 to the plurality of sound models (e.g., the sound model data 126) associated with emergency vehicle sounds. The particular sound 190 is associated with the emergency vehicle in response to a determination that the first audio properties 156 and the second audio properties 166 substantially match at least one sound model in the plurality of sound models.

In some implementations of the method 600, additional microphone arrays can be coupled to the roof of the autonomous vehicle to more accurately localize a sound source, such as the emergency vehicle. To illustrate, the method 600 can also include receiving a third audio frame and a corresponding third timestamp from at least one microphone of a third microphone array positioned at a third location on the roof of the autonomous vehicle. For example, referring to FIG. 1, the processor 112 receives the third audio frame 172 (including the third timestamp 174) from the microphone 171A positioned at the third location on the roof 102 of the autonomous vehicle 100. The third audio frame 172 is generated by the microphone 171A in response to the microphone 171A capturing the particular sound 190. The third timestamp 174 is generated by the microphone 171A (e.g., the third microphone unit 170) using the third internal clock 173. The third timestamp 174 is indicative of a time the third microphone 171 captured the particular sound 190. According to the above implementation of the method 600 where the third microphone 171 is positioned at the third location on the roof 102, the sound classification module 118 compares the third audio properties 176 of the third audio frame 172 to the plurality of sound models (e.g., the sound model data 126) associated with vehicle sounds.

The method 600 enables sound source localization using the microphone arrays 151, 161, 171 positioned at different locations on the roof 102 of the autonomous vehicle 100. For example, based on timestamps 154, 164, 174 indicating when a respective microphone array 151, 161 captures the particular sound 190 from the particular source 192, the computing system 110 can determine the location of the particular source 192 relative to the autonomous vehicle 100 and generate commands to maneuver the autonomous vehicle 100 based on the location of the particular source 192. Thus, the positions and orientations of the microphone arrays 151, 161 are used to localize the particular source 192.

Figure 7:
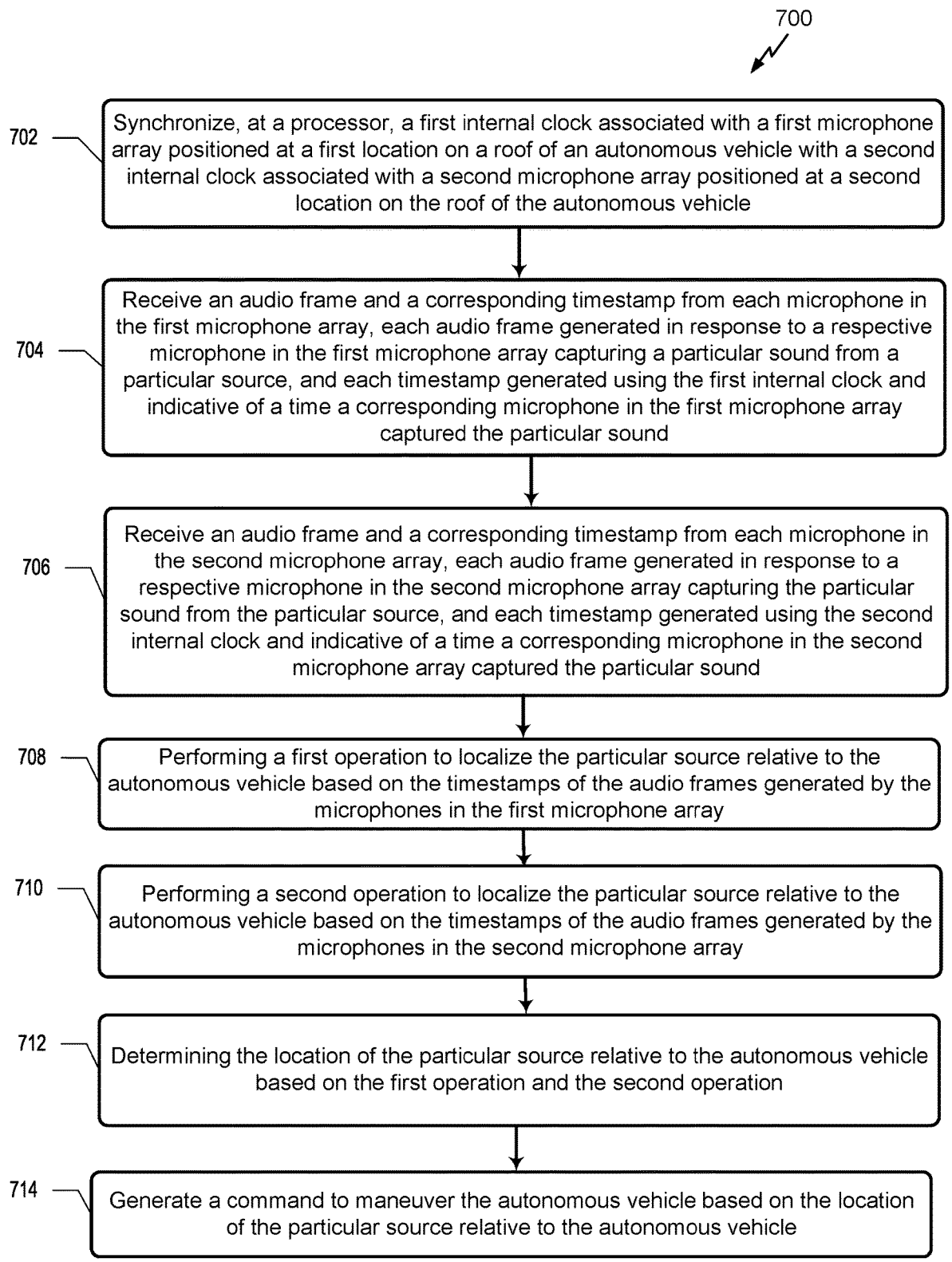
FIG. 7 is a flowchart of another method, according to an example embodiment.

FIG. 7 is a flowchart of a method 700 according to an example embodiment. The method 700 can be performed by the microphone units 150, 160, 170, the computing system 110, or a combination thereof.

The method 700 includes synchronizing, at a processor, a first internal clock associated with a first microphone array positioned at a first location on a roof of an autonomous vehicle with a second internal clock associated with a second microphone array positioned at a second location on the roof of the autonomous vehicle, at 702. For example, referring to FIGS. 1 and 4, the clock synchronization module 116 sends the synchronization signals 140 to the internal clocks 153, 163 to synchronize the internal clocks 153, 163.

The method 700 also includes receiving an audio frame and a corresponding timestamp from each microphone in the first microphone array, at 704. For example, referring to FIG. 4, the computing system 110 receives the audio frames 152A-152C from each microphone 151A-151C in the first microphone array 151. Each audio frame 152A-152C is generated in response to a respective microphone 151A-151C in the first microphone array 151 capturing the particular sound 190 from the particular source 192, and each timestamp 154A-154C is generated using the first internal clock 153 and is indicative of a time a corresponding microphone 151A-151C in the first microphone array 151 captured the particular sound 190.

The method 700 further includes receiving an audio frame and a corresponding timestamp from each microphone in the second microphone array, at 706. For example, referring to FIG. 4, the computing system 110 receives the audio frames 162A-162C from each microphone 161A-161C in the second microphone array 161. Each audio frame 162A-162C is generated in response to a respective microphone 161A-161C in the second microphone array 161 capturing the particular sound 190 from the particular source 192, and each timestamp 164A-164C is generated using the second internal clock 163 and is indicative of a time a corresponding microphone 161A-161C in the second microphone array 161 captured the particular sound 190.

The method 700 further includes performing a first operation to localize the particular source relative to the autonomous vehicle based on the timestamps of the audio frames generated by the microphones in the first microphone array, at 708. For example, referring to FIG. 4, the location module 120 performs the first operation to localize the particular source 192 relative to the autonomous vehicle 100 based on the timestamps 154A-154C of the audio frames 152A-152C generated by microphones 151A-151C in the first microphone array 151.

The method 700 also includes performing a second operation to localize the particular source relative to the autonomous vehicle based on the timestamps of the audio frames generated by the microphones in the second microphone array, at 710. For example, referring to FIG. 4, the location module 120 performs the second operation to localize the particular source 192 relative to the autonomous vehicle 100 based on the timestamps 164A-164C of the audio frames 162A-162C generated by microphones 161A-161C in the second microphone array 161.

The method 700 further includes determining the location of the particular source relative to the autonomous vehicle based on the first operation and the second operation, at 712.

The method 700 also includes generating a command to maneuver the autonomous vehicle based on the location of the particular source relative to the autonomous vehicle, at 714.

The method 700 enables sound source localization using the microphone arrays 151, 161, 171 positioned at different locations on the roof 102 of the autonomous vehicle 100. For example, based on timestamps 154, 164, 174 indicating when a respective microphone array 151, 161 captures the particular sound 190 from the particular source 192, the computing system 110 can determine the location of the particular source 192 relative to the autonomous vehicle 100 and generate commands to maneuver the autonomous vehicle 100 based on the location of the particular source 192. Thus, the positions and orientations of the microphone arrays 151, 161 are used to localize the particular source 192.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a first plurality of microphones positioned on an autonomous vehicle and associated with a first internal clock, each microphone of the first plurality of microphones able to capture a particular sound from a particular source to generate a corresponding audio frame having a timestamp based on the first internal clock, the timestamp indicative of a time a corresponding microphone of the first plurality of microphones captured the particular sound;
a second plurality of microphones positioned on the autonomous vehicle and associated with a second internal clock, each microphone of the second plurality of microphones able to capture the particular sound from the particular source to generate a corresponding audio frame having a timestamp based on the second internal clock, the timestamp indicative of a time a corresponding microphone of the second plurality of microphones captured the particular sound; and
a processor configured to:
synchronize the first internal clock with the second internal clock;
determine a location of the particular source relative to the autonomous vehicle based on the timestamps of the audio frames generated by the first plurality of microphones and the timestamps of the audio frames generated by the second plurality of microphones; and
generate a command to maneuver the autonomous vehicle based on the location of the particular source relative to the autonomous vehicle.

2. The system of claim 1, wherein the processor is further configured to:
perform a first operation to localize the particular source relative to the autonomous vehicle based on the timestamps of the audio frames generated by the first plurality of microphones; and
perform a second operation to localize the particular source relative to the autonomous vehicle based on the timestamps of the audio frames generated by the second plurality of microphones.

3. The system of claim 2, wherein, to perform the first operation, the processor is configured to:
determine that each audio frame from the first plurality of microphones captures the particular sound from the particular source;
compare the timestamps of each audio frame from the first plurality of microphones to determine a particular microphone of the first plurality of microphones that first captured the particular sound; and
localize the particular source relative to the autonomous vehicle based on a property of the particular microphone of the first plurality of microphones compared to properties of other microphones of the first plurality of microphones.

4. The system of claim 3, wherein the property of the particular microphone of the first plurality of microphones corresponds to a location of the particular microphone of the first plurality of microphones, and wherein the particular source is localized based on the location of the particular microphone of the first plurality of microphones compared to locations of the other microphones of the first plurality of microphones.

5. The system of claim 3, wherein the property of the particular microphone of the first plurality of microphones corresponds to an orientation of the particular microphone of the first plurality of microphones, and wherein the particular source is localized based on the orientation of the particular microphone of the first plurality of microphones compared to orientations of the other microphones of the first plurality of microphones.

6. The system of claim 1, wherein, to perform the second operation, the processor is configured to:
determine that each audio frame from the second plurality of microphones captures the particular sound from the particular source;
compare the timestamps of each audio frame from the second plurality of microphones to determine a particular microphone of the second plurality of microphones that first captured the particular sound; and
localize the particular source relative to the autonomous vehicle based on a property of the particular microphone of the second plurality of microphones compared to properties of other microphones of the second plurality of microphones.

7. The system of claim 6, wherein the property of the particular microphone of the second plurality of microphones corresponds to a location of the particular microphone of the second plurality of microphones, and wherein the particular source is localized based on the location of the particular microphone of the second plurality of microphones compared to locations of the other microphones of the second plurality of microphones.

8. The system of claim 6, wherein the property of the particular microphone of the second plurality of microphones corresponds to an orientation of the particular microphone of the second plurality of microphones, and wherein the particular source is localized based on the orientation of the particular microphone of the second plurality of microphones compared to orientations of the other microphones of the second plurality of microphones.

9. The system of claim 1, wherein the processor is further configured to:
receive a first audio frame and a corresponding first timestamp from a microphone of the first plurality of microphones;
receive a second audio frame and a corresponding second timestamp from a microphone of the second plurality of microphones; and
determine that the first audio frame and the second audio frame both capture the particular sound from the particular source.

10. The system of claim 9, wherein to determine that the first audio frame and the second audio frame both capture the particular sound from the particular source, the processor is configured to:
compare first audio properties of the first audio frame to second audio properties of the second audio frame.

11. The system of claim 1, further comprising:
a first microphone unit coupled to a roof of the autonomous vehicle at a first location, the first microphone unit comprising the first plurality of microphones and the first internal clock; and
a second microphone unit coupled to the roof of the autonomous vehicle at a second location, the second microphone unit comprising the second plurality of microphones and the second internal clock.

12. The system of claim 1, wherein the command to maneuver the autonomous vehicle comprises a command to reduce a speed of the autonomous vehicle.

13. The system of claim 1, wherein the command to maneuver the autonomous vehicle comprises a command to navigate the autonomous vehicle to a side of a road.

14. The system of claim 1, wherein the command to maneuver the autonomous vehicle comprises a command to change a mode of the autonomous vehicle into a user assist mode.

15. A method comprising:
synchronizing, at a processor, a first internal clock associated with a first plurality of microphones positioned on an autonomous vehicle with a second internal clock associated with a second plurality of microphones positioned on the autonomous vehicle;
receiving an audio frame and a corresponding timestamp from each microphone in the first plurality of microphones, each audio frame generated in response to a respective microphone in the first plurality of microphones capturing a particular sound from a particular source, and each timestamp generated using the first internal clock and indicative of a time a corresponding microphone in the first plurality of microphones captured the particular sound;
receiving an audio frame and a corresponding timestamp from each microphone in the second plurality of microphones, each audio frame generated in response to a respective microphone in the second plurality of microphones capturing the particular sound from the particular source, and each timestamp generated using the second internal clock and indicative of a time a corresponding microphone in the second plurality of microphones captured the particular sound;
determining a location of the particular source relative to the autonomous vehicle based on the timestamps of the audio frames generated by the first plurality of microphones and the timestamps of the audio frames generated by the second plurality of microphones; and
generating a command to maneuver the autonomous vehicle based on the location of the particular source relative to the autonomous vehicle.

16. The method of claim 15, wherein determining a location of the particular source relative to the autonomous vehicle based on the timestamps of the audio frames generated by the first plurality of microphones and the timestamps of the audio frames generated by the second plurality of microphones comprises:
performing a first operation to localize the particular source relative to the autonomous vehicle based on the timestamps of the audio frames generated by the first plurality of microphones; and
performing a second operation to localize the particular source relative to the autonomous vehicle based on the timestamps of the audio frames generated by the second plurality of microphones.

17. The method of claim 16, wherein performing the first operation comprises determining an azimuth of the particular source based on the timestamps of the audio frames generated by the microphones in the first plurality of microphones, and wherein performing the second operation comprises determining an azimuth of the particular source based on the timestamps of the audio frames generated by the microphones in the second plurality of microphones.

18. The method of claim 17, wherein performing the first operation comprises:
determining that each audio frame from the microphones in the first plurality of microphones captures the particular sound from the particular source;
comparing the timestamps of each audio frame from the microphones in the first plurality of microphones to determine a particular microphone that first captured the particular sound; and
localizing the particular source relative to the autonomous vehicle based on a property of the particular microphone compared to properties of other microphones in the first plurality of microphones.

19. The method of claim 17, wherein performing the second operation comprises:
determining that each audio frame from the microphones in the second plurality of microphones captures the particular sound from the particular source;
comparing the timestamps of each audio frame from the microphones in the second plurality of microphones to determine a particular microphone that first captured the particular sound; and
localizing the particular source relative to the autonomous vehicle based on a property of the particular microphone compared to properties of other microphones in the second plurality of microphones.

20. A non-transitory computer-readable medium having stored therein instructions executable by a computing device to cause the computing device to perform functions, the functions comprising:
synchronizing, at a processor, a first internal clock associated with a first plurality of microphones positioned on an autonomous vehicle with a second internal clock associated with a second plurality of microphones positioned on the autonomous vehicle;
receiving an audio frame and a corresponding timestamp from each microphone in the first plurality of microphones, each audio frame generated in response to a respective microphone in the first plurality of microphones capturing a particular sound from a particular source, and each timestamp generated using the first internal clock and indicative of a time a corresponding microphone in the first plurality of microphones captured the particular sound;
receiving an audio frame and a corresponding timestamp from each microphone in the second plurality of microphones, each audio frame generated in response to a respective microphone in the second plurality of microphones capturing the particular sound from the particular source, and each timestamp generated using the second internal clock and indicative of a time a corresponding microphone in the second plurality of microphones captured the particular sound;
determining a location of the particular source relative to the autonomous vehicle based on the timestamps of the audio frames generated by the first plurality of microphones and the timestamps of the audio frames generated by the second plurality of microphones; and
generating a command to maneuver the autonomous vehicle based on the location of the particular source relative to the autonomous vehicle.

* * * * *